Figure 1:
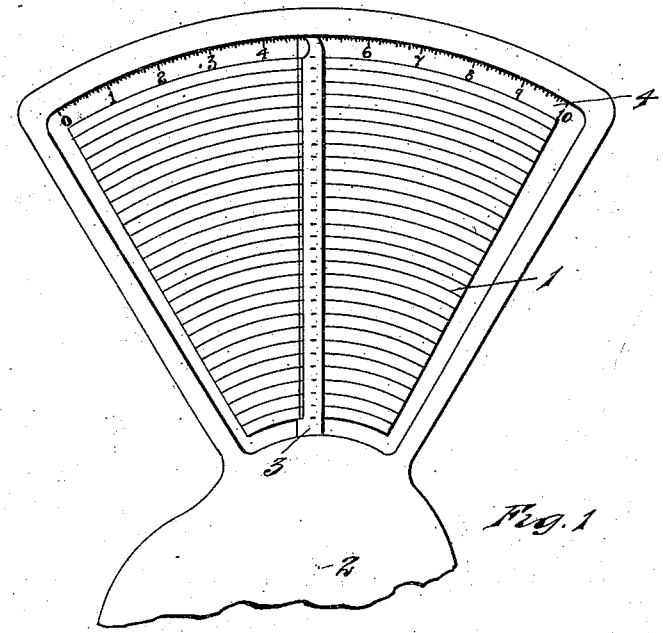

No. 832,379. PATENTED OCT. 2, 1906.
W. F. HARRIS.
INDICATOR FOR SCALES.
APPLICATION FILED MAY 16, 1906.

WITNESSES
C. E. Day
C. C. Jennings

INVENTOR.
William F. Harris
By Parker & Burton Attorneys.

UNITED STATES PATENT OFFICE.

WILLIAM F. HARRIS, OF DETROIT, MICHIGAN.

INDICATOR FOR SCALES.

No. 832,379.                Specification of Letters Patent.                Patented Oct. 2, 1906.

Application filed May 16, 1906. Serial No. 317,089.

*To all whom it may concern:*

Be it known that I, WILLIAM F. HARRIS, a citizen of the United States, residing at Detroit, county of Wayne, State of Michigan, have invented a certain new and useful Improvement in Indicators for Scales; and I declare the following to be a full, clear, and exact description of the invention, such as will enable others skilled in the art to which it pertains to make and use the same, reference being had to the accompanying drawings, which form a part of this specification.

This invention relates to indicators of scales.

It has for its object an improved means of locating on the graduated and numbered dial or chart of scales the value to be read therefrom.

In what are known as "computing-scales," whether the chart be a fixed dial over which a hand oscillates or a rotating cylinder upon which a particular part is brought to an indicating-point or a plate in front of which a beam swings or a plate which swings with the beam in front of an index, the surface is divided and to each point of the surface a given value is assigned, and the location of this point with respect to some other parts of the scale indicates to the user the value that he is to take as the result of the operation. Generally the operation consists in placing an article to be weighed upon the pan of the scale. This causes one part of the device to move over another part and come to rest at a place which will enable the operator to read both the weight of the article and its value, (the latter being determined by multiplying the weight by the price of a unit.)

In order that the chart may be useful for a large range of values, it is generally made large and divided into sections by lines, each section being graduated to determine the value at a price proper to that section; but as very frequently happens the amount to be weighed is not an exact multiple of the unit, but has a fractional part and the index comes to rest between points on the chart that have their values specifically determined, and the user is compelled to estimate the amount which he is to announce as the exact value of the article weighed. Because he is thus called upon to estimate it is desirable that the index be so arranged with respect to the chart upon which the values are shown that its exact location between marked points may be estimated with accuracy, and it is also desirable that the index itself obstruct the view upon the chart to the least possible degree, and the object of this invention is to produce an index which affords the least possible obstruction to a clear view of the chart and which at the same time can be seen in its location upon the chart with the greatest certainty.

One means of embodying the invention is shown in the drawings, in which—

Figure 2:
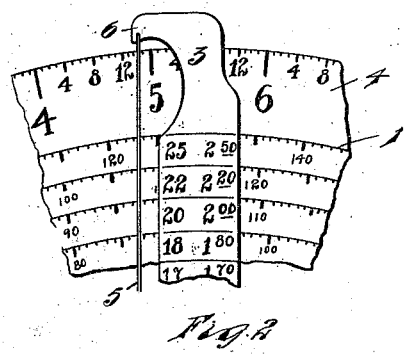
Figures 3, 4:
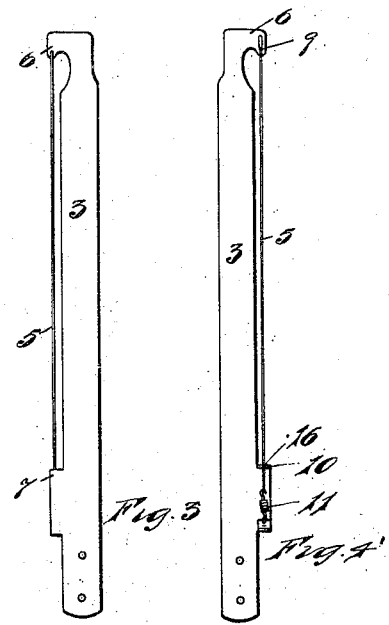

Figure 1 shows the chart of a scale having an oscillating index. Fig. 2 is an enlarged view of a portion of the chart and of the index-finger. Fig. 3 is a front view of the index-finger. Fig. 4 is a rear view of the index-finger.

The chart selected to illustrate the invention is divided into sections by curved lines 1, curved around a center 2, upon which the index-finger 3 oscillates. The outermost one, 4, of the sections is divided into portions which are numbered and which show units of weight—as, for example, pounds. Each of the other sections contains figures which are multiples of units of weight and fractions of units of weight by prices per pound. The index-finger 3 oscillates over the face of the chart, and this index-finger is also divided into sections, each one of which is considered as a price—as, for example, in Fig. 2, which represents the outer end of the index-finger and a portion of the chart under it. A portion of the section considered as indicating weights is shown showing "4," "5," and "6," indicating pounds, and with intermediate graduations showing the places at which the index will come to rest if the article weighs an exact number of ounces and is more than four pounds and less than six pounds.

With this invention the exact point to be selected is at one side of and a little distance away from the main part of the index-finger 3, and the exact line along which the points are to be selected is indicated by a fine thread 5, stretched from the overhanging part 6 of the index-finger 3 to a projecting portion 7 between the center and the inner line of indicating-figures. The thread 5 may be of any suitable material, preferably of very fine wire or metal, although any material that will stand the strain required to keep it straight may be employed. The end is secured to the overhang 6 and passes through a small hole 9, that locates the end accurately. The inner end is passed through a small hole 16 in the lug 10, which holds it accurately, and is then secured to the end of a spring 11, which holds the thread taut, returns it to its straight condition, if it has been bent or deflected in any way, and keeps it straight under all circumstances. The same principle of applying a thin thread-line indicator in connection with the usual index, which may be held at some little distance from the main part of the larger and coarse index and may enable the user to see the graduations at both sides of this thin index in order that he may estimate values accurately, may be applied to the oscillating index shown in the drawings or to any form of indicator in which an index is used to locate upon a plate or surface the value to be taken therefrom.

What I claim is—

1. In combination with the index of a scale, a pivoted indicator-arm adapted to move thereover, said arm being provided with laterally-projecting portions, a thread-like indicator drawn between said portions, one of said portions constituting a shoulder pierced with a guide-hole through which said indicator passes, and means attached to the arm and to that end of said indicator nearest to said shoulder for holding the indicator in a condition of tension, substantially as described.

2. In combination with a graduated index having projecting portions near each end, an indicator-filament stretched between said portions, one end being secured to its supporting part and the other end passing through a guide-hole in one of the projecting portions and extending past the same, and a spring whereby the end of the filament extending through said guide-hole is yieldingly held thereto, substantially as described.

3. An indicator for a scale, having in combination a pivoted arm, an indicator-thread carried thereby and spaced from its body portion, one part of said body portion constituting a shoulder provided with a guide-hole through which said thread passes, and a spiral spring attached to said body portion and to that end of the thread adjacent to said shoulder, whereby the thread is under constant tension but free to move lengthwise of its own axis, substantially as described.

4. In combination with a pivoted index-finger having laterally-projecting portions at each end, one of said portions being a shoulder pierced with a guide-hole whose axis is parallel to that of the finger, a filament attached to the projection at one end of said finger and extending therefrom through said guide-hole, and a spiral spring anchored to the body portion of the finger below the guide-hole and attached to the adjacent end of the filament, whereby the filament is constantly held under tension, substantially as described.

In testimony whereof I sign this specification in the presence of two witnesses.

WILLIAM F. HARRIS.

Witnesses:
CHARLES F. BURTON,
MAY E. KOTT.